US012576483B2

(12) United States Patent
Wang

(10) Patent No.: US 12,576,483 B2
(45) Date of Patent: Mar. 17, 2026

(54) INTERMEDIATE PARTITION PLATE POSITIONING APPARATUS AND BATTERY MODULE ASSEMBLING EQUIPMENT

(71) Applicant: CONTEMPORARY AMPEREX TECHNOLOGY (HONG KONG) LIMITED, Hong Kong (CN)

(72) Inventor: Wenchong Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 556 days.

(21) Appl. No.: 18/098,672

(22) Filed: Jan. 18, 2023

(65) Prior Publication Data

US 2023/0166385 A1    Jun. 1, 2023

Related U.S. Application Data

(63) Continuation of application No. PCT/CN2022/082802, filed on Mar. 24, 2022.

(30) Foreign Application Priority Data

Apr. 13, 2021    (CN) .......................... 202120745778.0

(51) Int. Cl.
B25B 11/00    (2006.01)
H01M 10/04    (2006.01)
(52) U.S. Cl.
CPC ......... B25B 11/00 (2013.01); H01M 10/0404 (2013.01)
(58) Field of Classification Search
CPC ........... B25B 11/00; B25B 5/02; B25B 5/006; H01M 10/0404; H01M 50/207; H01M 50/291
See application file for complete search history.

(56) References Cited

U.S. PATENT DOCUMENTS

| 10,644,344 B1 | 5/2020 | Ye et al. |
| 2014/0041901 A1 | 2/2014 | Tozawa |

(Continued)

FOREIGN PATENT DOCUMENTS

| CN | 104115304 B | * | 5/2017 | ......... H01M 50/291 |
| CN | 208507849 U | | 2/2019 | |

(Continued)

OTHER PUBLICATIONS

Extended European Search Report for EP application No. 22787351. 0, dated Jun. 18, 2024.

(Continued)

*Primary Examiner* — Sunil K Singh
*Assistant Examiner* — Jose K Abraham
(74) *Attorney, Agent, or Firm* — Ladas & Parry LLP

(57) ABSTRACT

An intermediate partition plate positioning apparatus and battery module assembling equipment are provided. The intermediate partition plate positioning apparatus includes: a supporting mechanism; a first adjusting mechanism, connected to the supporting mechanism, and configured to drive the supporting mechanism to move along a vertical direction; and a second adjusting mechanism. The second adjusting mechanism is located on at least one side of the supporting mechanism along a first horizontal direction. The second adjusting mechanism includes a clamping portion and a driving portion. The clamping portion is connected to the supporting mechanism. The driving portion is able to drive the clamping portion to move so that the clamping portion clamps the intermediate partition plate from two sides of the intermediate partition plate along a second horizontal direction. The first horizontal direction intersects the second horizontal direction.

9 Claims, 4 Drawing Sheets

(56)        References Cited

U.S. PATENT DOCUMENTS

2014/0356676 A1 * 12/2014 Yasooka ............. H01M 50/291
                                                                    429/99
2019/0305352 A1 * 10/2019 Hsu ................... H01M 10/0404
2022/0320614 A1 * 10/2022 Kondo ................. H01M 10/48

FOREIGN PATENT DOCUMENTS

| | | | | | |
|---|---|---|---|---|---|
| CN | 209078181 | U | | 7/2019 | |
| CN | 209507025 | U | * | 10/2019 | |
| CN | 209592147 | U | * | 11/2019 | |
| CN | 111048821 | A | | 4/2020 | |
| CN | 111342112 | A | * | 6/2020 | ........ H01M 10/0404 |
| CN | 210984863 | U | | 7/2020 | |
| CN | 111628204 | A | * | 9/2020 | ........ H01M 10/0404 |
| CN | 212113849 | U | | 12/2020 | |
| CN | 215070102 | U | | 12/2021 | |

OTHER PUBLICATIONS

International Search Report of Application No. PCT/CN2022/
082802, dated Jun. 9, 2022.

* cited by examiner

INTERMEDIATE PARTITION PLATE POSITIONING APPARATUS AND BATTERY MODULE ASSEMBLING EQUIPMENT

CROSS-REFERENCE TO RELATED APPLICATIONS

This application is a continuation of International Patent Application No. PCT/CN2022/082802, filed on Mar. 24, 2022, which claims priority to Chinese Patent Application No. 202120745778.0, filed on Apr. 13, 2021. The aforementioned patent applications are incorporated herein by reference in their entirety.

TECHNICAL FIELD

This application relates to the technical field of batteries, and in particular, to an intermediate partition plate positioning apparatus and battery module assembling equipment.

BACKGROUND

Battery cells are widely used in electronic devices such as a mobile phone, a notebook computer, an electric power cart, an electric vehicle, an electric airplane, an electric ship, an electric toy car, an electric toy ship, an electric toy airplane, and a power tool. The battery cells may include a nickel-cadmium battery cell, a nickel-hydrogen battery cell, a lithium-ion battery cell, a secondary alkaline zinc-manganese battery cell, and the like.

When a plurality of battery cells are used in groups, the plurality of battery cells are assembled together to form a battery module. How to improve the capacity of the battery module and improve the assembling process of battery modules has always been a research topic in the industry.

SUMMARY

This application provides an intermediate partition plate positioning apparatus and battery module assembling equipment to improve the assembling process of battery modules.

According to one aspect, an embodiment of this application discloses an intermediate partition plate positioning apparatus, applicable to assembling of a battery module. The battery module includes at least two submodules and an intermediate partition plate. Each submodule includes a plurality of battery cells. The intermediate partition plate is disposed between two adjacent submodules. The intermediate partition plate positioning apparatus includes: a supporting mechanism, configured to hold the intermediate partition plate; a first adjusting mechanism, connected to the supporting mechanism, and configured to drive the supporting mechanism to move along a vertical direction; and a second adjusting mechanism. The second adjusting mechanism is located on at least one side of the supporting mechanism along a first horizontal direction. The second adjusting mechanism includes a clamping portion and a driving portion. The clamping portion is connected to the supporting mechanism. The driving portion is able to drive the clamping portion to move so that the clamping portion clamps the intermediate partition plate from two sides of the intermediate partition plate along a second horizontal direction. The first horizontal direction intersects the second horizontal direction.

In the foregoing solution, the position of the intermediate partition plate is adjusted in the horizontal direction and the vertical direction by the first adjusting mechanism and the second adjusting mechanism that are disposed on the supporting mechanism. In this way, after the position is adjusted in the horizontal direction, the intermediate partition plate can be aligned with a position directly below a reserved clearance at a high precision, and then the first adjusting mechanism drives the intermediate partition plate to move along the vertical direction, so that the intermediate partition plate can be smoothly inserted into the reserved clearance. In this way, with the assistance of the intermediate partition plate positioning apparatus, the intermediate partition plate is positioned between adjacent submodules during the assembling of the battery module, thereby ensuring a relatively high precision of assembling the battery module. In addition, the high-precision alignment and adjustment performed beforehand can avoid collision between the intermediate partition plate and the submodule in a process of inserting the intermediate partition plate into the reserved clearance, and avoid damage to a dielectric film of a battery cell.

According to an aspect of embodiments of this application, the clamping portion includes two clamping plates disposed opposite to each other along the second horizontal direction. The driving portion is able to drive the two clamping plates to approach each other or move away from each other in the second horizontal direction, so as to clamp or release the intermediate partition plate.

With the clamping plates disposed according to the foregoing solution, the opposite surfaces of the two clamping plates can be in face-to-face contact with the surfaces of the intermediate partition plate, thereby diffusing the clamping force exerted on the intermediate partition plate by the two clamping plates that clamp the intermediate partition plate, and avoiding stress-induced deformation of the clamped part of the intermediate partition plate on the basis of ensuring stability of the clamping.

According to an aspect of embodiments of this application, a second adjusting mechanism is disposed on both sides of the supporting mechanism along the second horizontal direction. At least one of the two second adjusting mechanisms is movably connected to the supporting mechanism, so that the second adjusting mechanism is able to approach or move away from the supporting mechanism along the first horizontal direction.

In the foregoing solution, with the second adjusting mechanism being movably connected to the supporting mechanism, the distance between the two second adjusting mechanisms in the first horizontal direction is adjustable, thereby making it convenient to clamp the intermediate partition plates of different sizes. In addition, the clamped intermediate partition plate can be finely tuned in the horizontal direction through the fit between the movable second adjusting mechanism and the movable clamping portion, thereby improving the alignment precision of the intermediate partition plate before insertion into the reserved clearance.

According to an aspect of embodiments of this application, the intermediate partition plate positioning apparatus further includes a driving mechanism. The driving mechanism is disposed on the supporting mechanism. The driving mechanism is connected to at least one of the second adjusting mechanisms, and is configured to drive the second adjusting mechanism to move along the first horizontal direction.

In the foregoing solution, with the driving mechanism disposed, the movably connected second adjusting mechanism is caused to move close to or away from the fixed second adjusting mechanism along the first horizontal direction, thereby facilitating adjustment and improving the positioning efficiency.

According to an aspect of embodiments of this application, one of the two second adjusting mechanisms is fixed to the supporting mechanism, and the other is movably connected to the supporting mechanism by the driving mechanism.

In the foregoing solution, the requirements of positioning the intermediate partition plates of different sizes can be fulfilled. In addition, in a process of positioning the intermediate partition plate in the horizontal direction, the second adjusting mechanism is fixed and thereby used as a benchmark against which the intermediate partition plate is positioned. In this way, it is ensured that the intermediate partition plate is located directly below the reserved clearance after the intermediate partition plate is disposed on the intermediate partition plate positioning apparatus. The positioning precision is relatively high, without being reduced during the adjustment.

According to an aspect of embodiments of this application, the intermediate partition plate positioning apparatus further includes at least one positioning piece. The positioning piece is located on at least one of the supporting mechanism or the driving mechanism. The positioning piece includes a positioning face. The positioning face is perpendicular to the second horizontal direction. The positioning face is configured to fit closely with the intermediate partition plate in the second horizontal direction.

In the foregoing solution, before the second adjusting mechanism acts on the intermediate partition plate, the position of the intermediate partition plate in the horizontal direction of the supporting mechanism can basically be located directly below the reserved clearance, so that the intermediate partition plate can be positioned efficiently at a high precision after being fine-tuned and clamped by the second adjusting mechanism.

According to an aspect of embodiments of this application, two baffles spaced out along the second horizontal direction are disposed on the supporting mechanism. A slot is formed between the two baffles and is configured to limit movement of the intermediate partition plate in the second horizontal direction.

In the foregoing solution, the disposed slot can avoid the vulnerability to tilting of the intermediate partition plate placed on the supporting mechanism, and avoid the impact thereby caused to the precision of clamping and positioning the intermediate partition plate by the clamping portion.

According to an aspect of embodiments of this application, the first adjusting mechanism includes a cradle and a driving cylinder. At least one driving cylinder is fixed to the cradle. The driving cylinder is connected to the supporting mechanism to drive the supporting mechanism to move along the vertical direction.

In the foregoing solution, the disposed first adjusting mechanism that can perform adjustment in the vertical direction facilitates the grab and placement of the intermediate partition plate on the intermediate partition plate positioning apparatus, and can drive the intermediate partition plate to settle in the reserved clearance to complete the assembling, thereby preventing the intermediate partition plate in motion from interfering with the submodule on the basis of ensuring a relatively high alignment precision of assembling in the vertical direction, and improving the assembling precision.

According to an aspect of embodiments of this application, the first adjusting mechanism further includes a guide rail and a slide block that fit with each other. One of the guide rail or the slide block is fixed to the cradle, and the other is connected to the supporting mechanism, so that the supporting mechanism is able to slide against the cradle in the vertical direction.

In the foregoing solution, the mutually fitted guide rail and slide block serve to guide movement and help the driving cylinder to drive the supporting mechanism to move along the vertical direction, thereby ensuring a relatively high precision of the movement of the supporting mechanism in the vertical direction.

According to another aspect, an embodiment of this application further discloses battery module assembling equipment. The battery module assembling equipment includes the intermediate partition plate positioning apparatus according to any embodiment of the first aspect described above.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
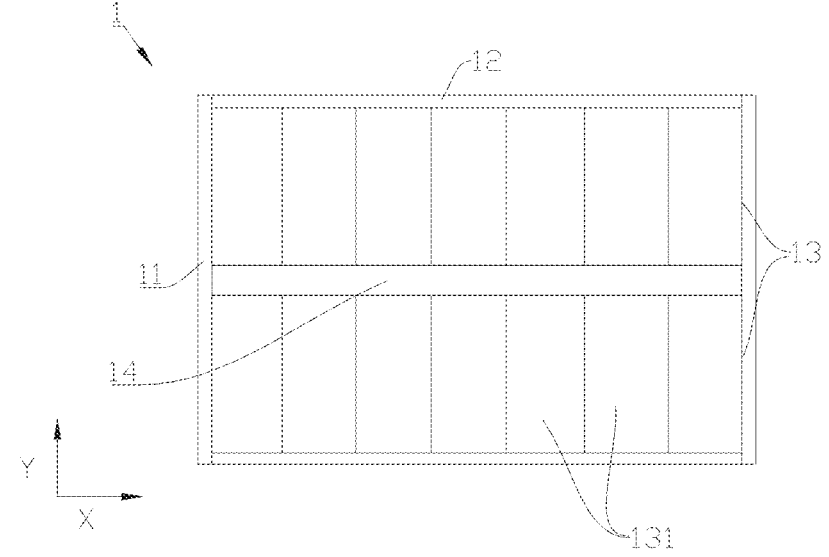
FIG. 1 is a top view of a battery module according to some embodiments of this application.

The drawings are not drawn to scale.

DETAILED DESCRIPTION

To make the objectives, technical solutions, and advantages of the embodiments of this application clearer, the following gives a clear description of the technical solutions in the embodiments of this application with reference to the drawings in the embodiments of this application. Evidently, the described embodiments are merely a part of but not all of the embodiments of this application. All other embodiments derived by a person of ordinary skill in the art based on the embodiments of this application without making any creative efforts fall within the protection scope of this application.

Unless otherwise defined, all technical and scientific terms used herein have the same meanings as usually understood by a person skilled in the technical field of this application. The terms used in the specification of this application are merely intended for describing specific embodiments but are not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described in this application may be combined with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art understands the specific meanings of the terms in this application according to the context.

The term "and/or" in this application indicates merely a relation for describing the related items, and represents three possible relationships. For example, "A and/or B" may represent the following three circumstances: A alone, both A and B, and B alone. In addition, the character "/" herein generally indicates an "or" relationship between the item preceding the character and the item following the character.

"A plurality of" referred to in this application means two or more (including two). Similarly, "a plurality of groups" means two or more groups (including two groups).

In this application, the term "parallel" includes not only absolute parallelism, but also approximate parallelism conventionally known in engineering. Similarly, the term "perpendicular" or "vertical" includes not only absolute perpendicularity, but also approximate perpendicularity conventionally known in engineering.

Due to advantages such as a high energy density, a high power density, reusability for many cycles, and a long storage time, battery cells such as a lithium-ion secondary battery cell, a lithium-sulfur battery cell, a sodium-lithium-ion battery cell, a sodium-ion battery cell, or a magnesium-ion battery cell have been widely used in electrical devices in which the battery cells are applicable. For example, the electrical device may be a mobile phone, a portable device, a notebook computer, an electric power cart, an electric vehicle, a ship, a spacecraft, an electric toy, an electric tool, or the like. For example, the spacecraft includes an airplane, a rocket, a space shuttle, a spaceship, and the like. The electric toy includes a fixed or mobile electric toy, such as a game console, an electric car toy, an electric ship toy, an electric airplane toy, and the like. The electric tool includes an electric tool for metal cutting, an electric grinding tool, an electric assembly tool, an electric tool for railways, such as an electric drill, an electric grinder, an electric wrench, an electric screwdriver, an electric hammer, an electric impact drill, a concrete vibrator, and an electric planer.

Understandably, the technical solutions described in embodiments of this application are not only applicable to the devices described above, but also applicable to all devices that use a battery.

To meet different power usage requirements, a plurality of battery cells may be connected in series, parallel, or series-and-parallel pattern to form a battery module, and then a plurality of battery modules may be connected in series, parallel, or series-and-parallel pattern to form a battery. The battery may also be referred to as a battery pack.

FIG. 1 is a top view of a battery module according to an embodiment of this application; As shown in FIG. 1, a direction indicated by the arrow X is a first horizontal direction, and a direction indicated by the arrow Y is a second horizontal direction. Illustratively, the first horizontal direction is perpendicular to the second horizontal direction.

In some embodiments, a battery module 1 includes a plurality of submodules 13. The plurality of submodules 13 are arranged along the second horizontal direction Y Each submodule 13 includes a plurality of battery cells 131 arranged in sequence along the first horizontal direction X. Illustratively, as shown in FIG. 1, there are two submodules 13.

In some embodiments, the battery module 1 further includes two end plates 11 and two side plates 12. In the first horizontal direction X, the plurality of submodules 13 are located between the two end plates 11. In the second horizontal direction Y, the plurality of submodules 13 are located between the two side plates 12. Illustratively, the two end plates 11 are connected to the two side plates 12 and form a rectangular frame structure to fix a plurality of submodules 13. In embodiments of this application, a plurality of submodules 13 are integrated in the battery module 1, thereby increasing the capacity of an individual battery module 1.

In some embodiments, the battery module 1 further includes an intermediate partition plate 14. The intermediate partition plate 14 is disposed between adjacent submodules 13. Two ends of the intermediate partition plate 14 are connected to the two end plates 11 respectively. A battery cell is prone to expand during use and thereby apply an expansion force to the end plates 11. By disposing the intermediate partition plate 14, this application can increase the overall strength of the battery module 1, and reduce the risk of detaching the end plates 11 from the side plates 12 under the expansion force.

During assembling of a battery module 1, the inventor of this application fixes a plurality of submodules 13 first, and then inserts an intermediate partition plate 14 between adjacent submodules 13. However, the inventor finds that, because the spacing between adjacent submodules 13 is relatively small, a high precision is required for the positioning of the intermediate partition plate 14 during the assembling of the intermediate partition plate 14. In a case that the intermediate partition plate 14 deviates from a preset position, the battery cell 131 is very vulnerable to scratches, thereby affecting the performance of the battery cell 131. In the related art known to the inventor of this application, no structure for positioning the intermediate partition plate 14 is disposed in the battery module assembling equipment.

In view of this, this application provides an intermediate partition plate positioning apparatus and battery module assembling equipment to bring the intermediate partition plate 14 into position during the assembling of the battery module 1, thereby reducing the risk of the intermediate partition plate 14 scratching the battery cell 131.

An embodiment of this application provides battery module assembling equipment, including an intermediate partition plate positioning apparatus. During the assembling of the battery module 1, after adjacent submodules 13 of a battery module 1 are positioned, the intermediate partition plate 14 is positioned into a reserved clearance between two corresponding submodules 13 by the intermediate partition plate positioning apparatus, and the intermediate partition plate 14 is welded to the end plate 11 to obtain a desired battery module 1 of a high energy density.

During the assembling of the battery module 1, in order to accurately insert the intermediate partition plate 14 into the reserved clearance between the adjacent submodules 13 conveniently by using the intermediate partition plate positioning apparatus, the intermediate partition plate positioning apparatus may be pre-disposed directly below the reserved clearance between the corresponding submodules 13 in the battery module assembling equipment, so that the intermediate partition plate 14 can be inserted into the reserved clearance from bottom upward by using the disposed intermediate partition plate positioning apparatus. Alternatively, the intermediate partition plate 14 may be inserted into the reserved clearance from other directions, without being specifically limited herein. To facilitate mounting and ensure the continuity of assembling steps and the stability of the intermediate partition plate positioning apparatus in the battery module assembling equipment, the following describes the intermediate partition plate positioning apparatus in detail using an example in which the intermediate partition plate 14 is inserted into the reserved clearance from bottom upward.

Understandably, when there are a plurality of submodules 13, a plurality of intermediate partition plate positioning apparatuses may be disposed below the corresponding clearances respectively. Alternatively, just one intermediate partition plate positioning apparatus is disposed, and the intermediate partition plate 14 is inserted into different reserved clearances separately by moving the intermediate partition plate positioning apparatus during the assembling, without being limited herein. The following describes the intermediate partition plate positioning apparatus in detail using an example in which one intermediate partition plate positioning apparatus corresponds to one reserved clearance between the submodules 13.

Figure 2:
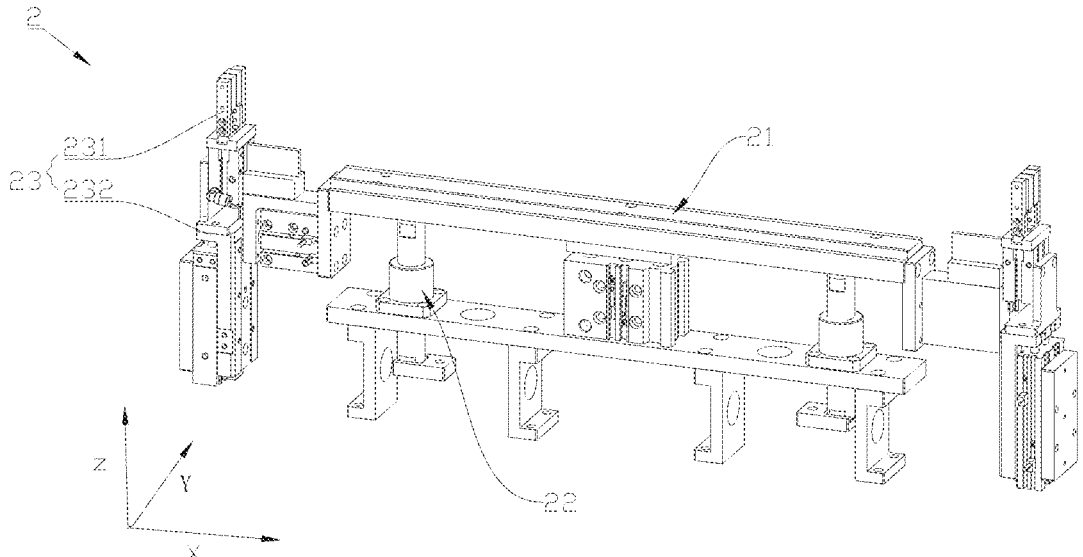
FIG. 2 is a schematic structural diagram of an intermediate partition plate positioning apparatus according to some embodiments of this application.

FIG. 2 is a schematic structural diagram of an intermediate partition plate positioning apparatus according to some embodiments of this application. As shown in FIG. 2, a direction indicated by the arrow X is a first horizontal direction, a direction indicated by the arrow Y is a second horizontal direction, and a direction indicated by the arrow Z is a vertical direction. Illustratively, the first horizontal direction, the second horizontal direction, and the vertical direction are perpendicular to one another.

An embodiment of this application provides an intermediate partition plate positioning apparatus. The intermediate partition plate positioning apparatus 2 includes a supporting mechanism 21, a first adjusting mechanism 22, and a second adjusting mechanism 23. The supporting mechanism 21 is configured to hold an intermediate partition plate. The first adjusting mechanism 22 is connected to the supporting mechanism 21. The first adjusting mechanism 22 is configured to drive the supporting mechanism 21 to move along the vertical direction Z. The second adjusting mechanism 23 is located on at least one side of the supporting mechanism 21 along the first horizontal direction X. The second adjusting mechanism 23 includes a clamping portion 231 and a driving portion 232. The clamping portion 231 is connected to the supporting mechanism 21. The driving portion 232 is able to drive the clamping portion 231 to move so that the clamping portion 231 clamps the intermediate partition plate from two sides of the intermediate partition plate along the second horizontal direction Y.

The supporting mechanism 21 is configured to support the intermediate partition plate, and adjust the position of the intermediate partition plate in the horizontal direction and the vertical direction Z by using the first adjusting mechanism 22 and the second adjusting mechanism 23 that are disposed on the supporting mechanism 21. In this way, after the position is adjusted in the horizontal direction, the intermediate partition plate can be aligned with a position directly below a reserved clearance at a high precision. Subsequently, the first adjusting mechanism 22 drives the intermediate partition plate to move along the vertical direction Z, so that the intermediate partition plate can be smoothly inserted into the reserved clearance.

With the assistance of the intermediate partition plate positioning apparatus 2, the intermediate partition plate is positioned between adjacent submodules during the assembling of the battery module, thereby ensuring a relatively high precision of assembling the battery module. In addition, the high-precision alignment and adjustment performed beforehand can avoid collision between the intermediate partition plate and the submodule or an end plate in a process of inserting the intermediate partition plate into the reserved clearance, and avoid damage to a dielectric film of a battery cell.

Figure 3:
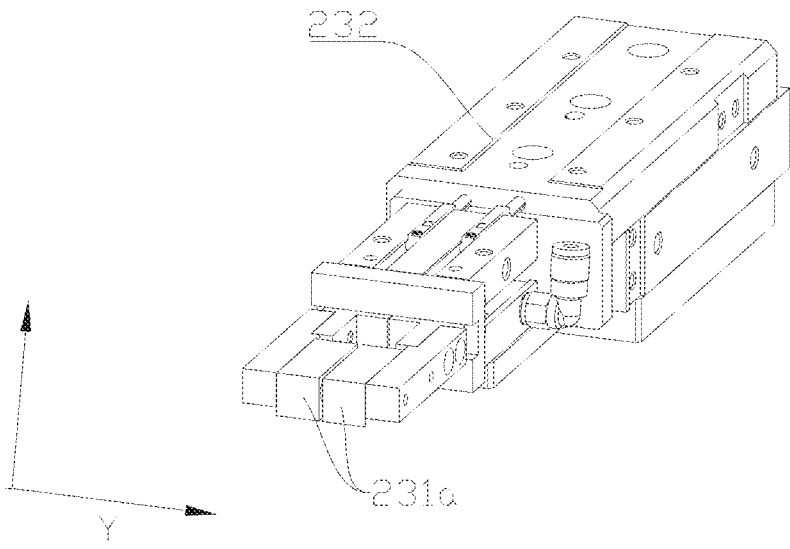
FIG. 3 is a schematic structural diagram of a second adjusting mechanism in an intermediate partition plate positioning apparatus according to some embodiments of this application.

In some specific embodiments, as shown in FIG. 3, the clamping portion includes two clamping plates 231a disposed opposite to each other along the second horizontal direction Y. The driving portion 232 is able to drive the two clamping plates 231a to approach each other or move away from each other in the second horizontal direction Y, so as to clamp or release the intermediate partition plate. To facilitate the positioning of the intermediate partition plate in the horizontal direction, two clamping plates 231a configured to clamp and position the intermediate partition plate are disposed opposite to each other. The driving portion 232 drives the two clamping plates 231a to approach each other or move away from each other. When the two clamping plates 231a approach each other to clamp the intermediate partition plate, the disposed clamping plates 231a enable the opposite surfaces of the two clamping plates 231a to contact the surfaces of the intermediate partition plate in a face-to-face manner, thereby diffusing the clamping force exerted on the intermediate partition plate by the two clamping plates 231a that clamp the intermediate partition plate, and avoiding stress-induced deformation of the clamped part of the intermediate partition plate on the basis of ensuring stability of the clamping.

Optionally, the clamping portion may be other structures capable of clamping the intermediate partition plate in the horizontal direction instead, without being specifically limited herein. In addition, in order to avoid deformation of the intermediate partition plate at a position corresponding to the clamping portion while the clamping portion clamps the intermediate partition plate, a structure for avoidance of hard contact such as a cushion may be disposed on a contact surface of the clamping portion in contact with the intermediate partition plate, without being described in detail herein.

It is hereby noted that the second adjusting mechanism 23 is disposed on the supporting mechanism 21 for convenience of clamping the intermediate partition plate along the second horizontal direction Y so as to perform horizontal alignment. Therefore, with respect to the second adjusting mechanism 23 disposed, the second adjusting mechanism 23 may be disposed on at least one side of the supporting mechanism 21 in the first horizontal direction X, depending on practical applications, alignment precision, and other requirements. In this application, in view of the specific implementation of the second adjusting mechanism 23 disposed and the positioning requirement of the intermediate partition plate to be positioned, the second adjusting mechanism 23 is disposed on both sides of the supporting mechanism 21 along the second horizontal direction. The following describes in detail the specific structure of the second adjusting mechanism 23 and the specific implementations of fitting with other structures.

In some specific embodiments, at least one of the two second adjusting mechanisms 23 is movably connected to the supporting mechanism 21, so that the second adjusting mechanism 23 is able to approach or move away from the supporting mechanism 21 along the first horizontal direction X. With the second adjusting mechanism 23 being movably connected to the supporting mechanism 21, the distance between the two second adjusting mechanisms 23 in the first horizontal direction X is adjustable, thereby making it convenient to clamp the intermediate partition plates of different sizes. In addition, the clamped intermediate partition plate can be finely tuned in the horizontal direction through the fit between the movable second adjusting mechanism 23 and the movable clamping portion 231, thereby improving the alignment precision of the intermediate partition plate before insertion into the reserved clearance.

Figure 4:
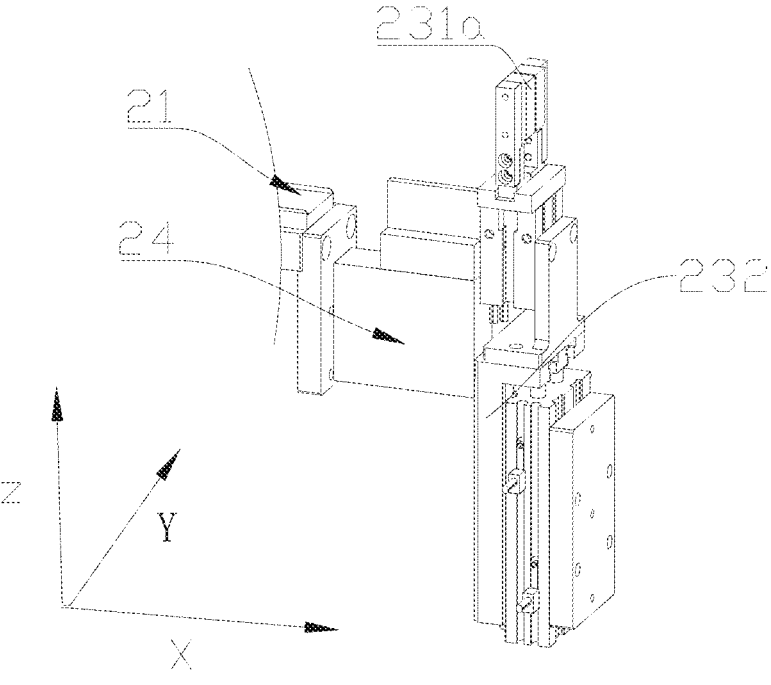
FIG. 4 is a schematic structural diagram of a second adjusting mechanism in fit with a driving mechanism in an intermediate partition plate positioning apparatus according to some embodiments of this application.
Figure 5:
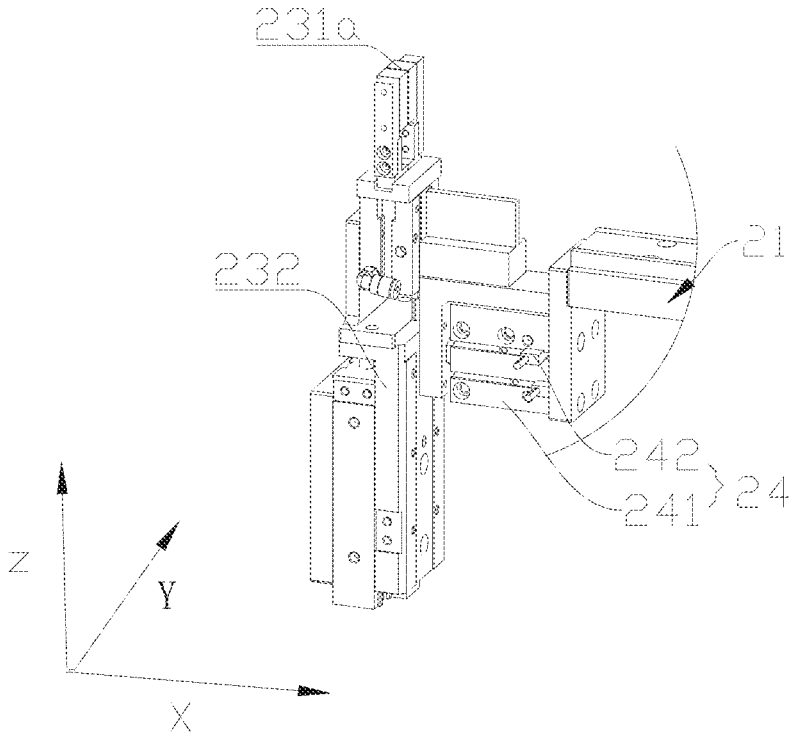
FIG. 5 is a schematic structural diagram of a second adjusting mechanism in fit with a driving mechanism in another intermediate partition plate positioning apparatus according to some embodiments of this application.

Illustratively, as shown in FIG. 4 and FIG. 5, one of the two second adjusting mechanisms is fixed to the supporting mechanism 21, and the other is movably connected to the supporting mechanism 21. By fixedly connecting one of the two second adjusting mechanisms to the supporting mechanism and movably connecting the other to the supporting mechanism 21, the position of the fixedly connected second adjusting mechanism may be used as a benchmark against which the intermediate partition plate can be conveniently disposed on the supporting mechanism 21 during pre-mounting of the intermediate partition plate on the supporting mechanism 21. Subsequently, the movably connected second adjusting mechanism is adjusted based on the length of the intermediate partition plate along the first horizontal direction X. Finally, the intermediate partition plate is clamped through the mutual fit between the two second adjusting mechanisms 23, thereby implementing the clamping and positioning of the intermediate partition plate in the horizontal direction. In this way, the requirements of positioning the intermediate partition plates of different sizes can be fulfilled. In addition, in a process of positioning the intermediate partition plate in the horizontal direction, the second adjusting mechanism is fixed and thereby used as a benchmark against which the intermediate partition plate is positioned. In this way, it is ensured that the intermediate partition plate is located directly below the reserved clearance after the intermediate partition plate is disposed on the intermediate partition plate positioning apparatus. The positioning precision is relatively high, without being reduced during the adjustment.

As shown in FIG. 5, in order to enable the movably connected second adjusting mechanism to approach or move away from the fixed second adjusting mechanism along the first horizontal direction X, the intermediate partition plate positioning apparatus further includes a driving mechanism 24. The driving mechanism 24 is disposed on the supporting mechanism 21. The driving mechanism 24 is connected to the second adjusting mechanism, and is configured to drive the second adjusting mechanism to move along the first horizontal direction X. Understandably, the driving mechanism 24 may be a driving cylinder, or may be a structure of a slide rail 241 and a slide block 242 that fit with each other. The supporting mechanism 21 contains the slide rail 241 extending along the first horizontal direction X. The slide block 242 is connected to the second adjusting mechanism. The slide block 242 can slide relatively and may be limited to a given position of the slide rail 241 as required, thereby adjusting the distance between the two second adjusting mechanisms, without being specifically limited herein.

Figure 6:
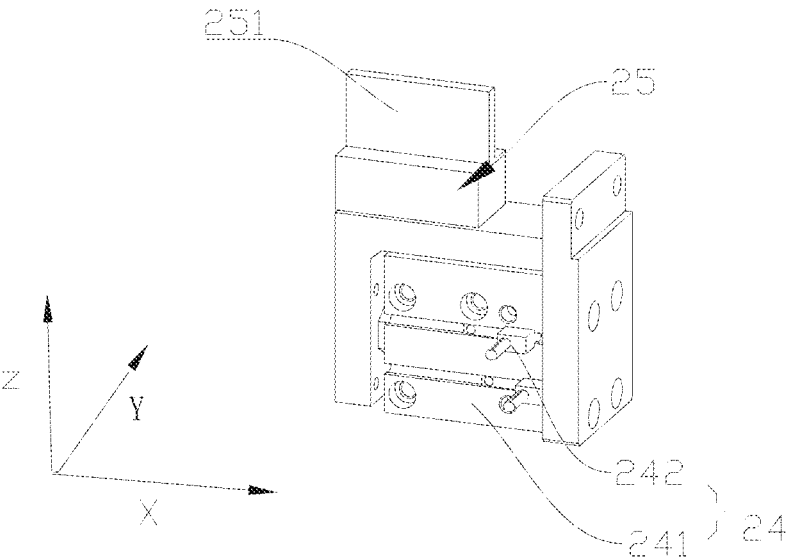
FIG. 6 is a schematic structural diagram of a positioning piece corresponding to a movably connected second adjusting mechanism in an intermediate partition plate positioning apparatus according to some embodiments of this application.

In some specific embodiments, as shown in FIG. 6, when the intermediate partition plate is disposed on the supporting mechanism, before the second adjusting mechanism acts on the intermediate partition plate, the position of the intermediate partition plate in the horizontal direction of the supporting mechanism 21 can basically be located directly below the reserved clearance, so that the intermediate partition plate can be positioned efficiently at a high precision after being fine-tuned and clamped by the second adjusting mechanism. For this purpose, the intermediate partition plate positioning apparatus further includes at least one positioning piece 25. The positioning piece 25 is located on at least one of the supporting mechanism and the driving mechanism 24. In this way, when the intermediate partition plate is placed on the supporting mechanism, the positioning piece 25 can be fitted closely with and/or aligned with the intermediate partition plate conveniently, thereby implementing pre-positioning of the intermediate partition plate, and improving the positioning efficiency of the intermediate partition plate.

Figure 7:
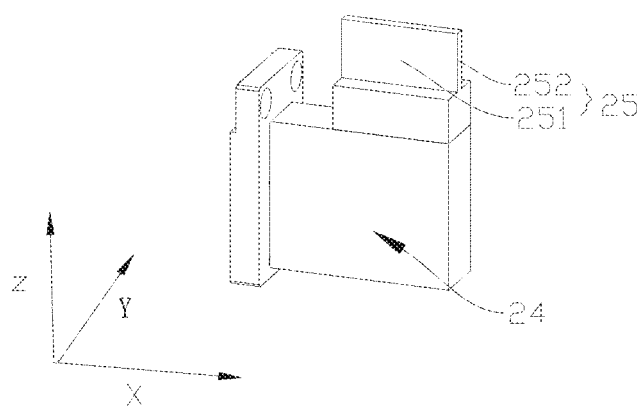
FIG. 7 is a schematic structural diagram of a positioning piece corresponding to a fixedly connected second adjusting mechanism in an intermediate partition plate positioning apparatus according to some embodiments of this application.
Figure 8:
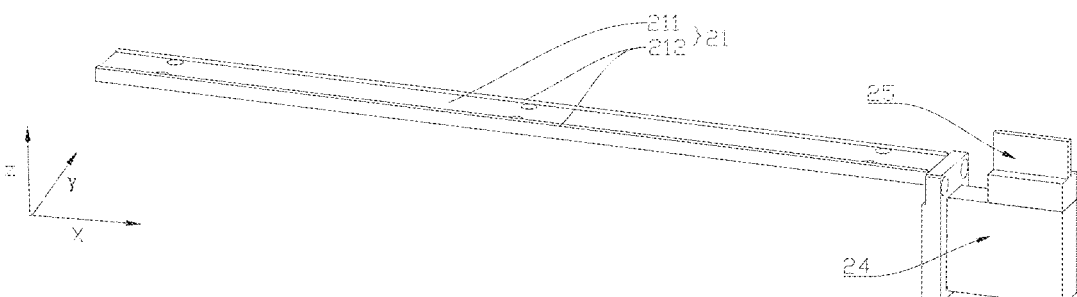
FIG. 8 is a schematic structural diagram of a supporting mechanism according to some embodiments of this application.

Optionally, as shown in FIG. 6, FIG. 7, and FIG. 8, the positioning piece 25 may include a positioning face 251. The positioning face 251 is perpendicular to the second horizontal direction Y. When the intermediate partition plate is placed on the supporting mechanism 21, an alignment face of the intermediate partition plate may be identified and fitted closely with the positioning face 251 in the second horizontal direction Y, thereby ensuring a relatively high positioning precision of the intermediate partition plate in the second horizontal direction Y. The positioning piece 25 may further include an alignment end face 252. The alignment end face 252 is located on a side of the first horizontal direction X toward the second adjusting mechanism. The shape of the intermediate partition plate is designed to fit the shape of the reserved clearance formed by combining different shapes of the two submodules. Generally, the intermediate partition plate is bumpy and rough in shape. The alignment end face 252 is selected in view of shape characteristics of the intermediate partition plate, and enables the intermediate partition plate to be pre-positioned in the first horizontal direction X when the concave face of the intermediate partition plate in the first horizontal direction X is flush with the alignment end face 252. Alternatively, depending on the specific shape of the intermediate partition plate, the positioning piece 25 may include other surfaces or structures capable of implementing pre-positioning, without being specifically limited herein.

In addition, as shown in FIG. 8, the supporting mechanism 21 includes a supporting platform 211 in order to avoid an excessive tilt of an abutment surface of the intermediate partition plate to be placed on the supporting mechanism 21 after the intermediate partition plate is pre-positioned in the horizontal direction and before the intermediate partition plate is further positioned by the second adjusting mechanism. The excessive tilt affects the precision of the clamping portion in clamping and positioning the intermediate partition plate. The supporting platform 211 is configured to hold the intermediate partition plate, and contains two baffles 212 spaced out along the second horizontal direction Y. A slot is formed between the two baffles 212, and is configured to limit the movement of the intermediate partition plate in the second horizontal direction Y.

Figure 9:
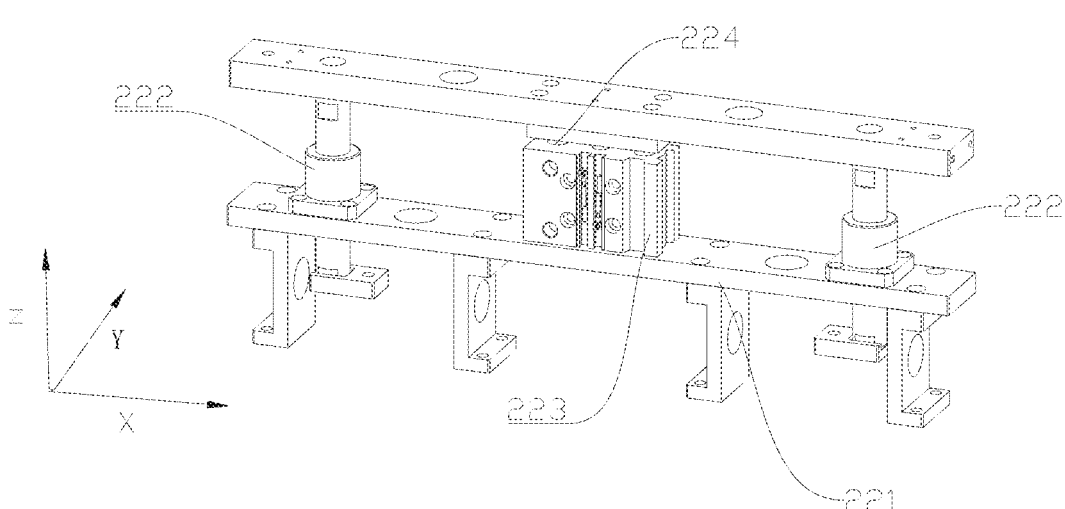
FIG. 9 is a schematic structural diagram of a first adjusting mechanism according to some embodiments of this application.

In some specific embodiments, as shown in FIG. 9, the first adjusting mechanism includes a cradle 221 and a driving cylinder 222. At least one driving cylinder 222 is fixed to the cradle 221. The driving cylinder 222 is connected to the supporting mechanism to drive the supporting mechanism to move along the vertical direction Z. After the intermediate partition plate is positioned directly below the reserved clearance, in order to smoothly insert the intermediate partition plate into the reserved clearance, the disposed driving cylinder 222 drives the supporting mechanism to move along the vertical direction Z, so that the intermediate partition plate on the supporting mechanism is gradually inserted into the reserved clearance. The disposed first adjusting mechanism that can perform adjustment in the vertical direction Z facilitates the grab and placement of the intermediate partition plate on the intermediate partition plate positioning apparatus, and can drive the intermediate partition plate to settle in the reserved clearance to complete the assembling, thereby preventing the intermediate partition plate in motion from interfering with the submodule on the basis of ensuring a relatively high alignment precision of assembling in the vertical direction Z, and improving the assembling precision.

Optionally, the first adjusting mechanism further includes a guide rail 223 and a slide block 224 that fit with each other. One of the guide rail 223 or the slide block 224 is fixed to the cradle 221, and the other is connected to the supporting mechanism, so that the supporting mechanism is able to slide against the cradle 221 in the vertical direction Z. The mutually fitted guide rail 223 and slide block 224 serve to guide movement and help the driving cylinder 222 to drive the supporting mechanism to move along the vertical direction Z, thereby ensuring a relatively high precision of the movement of the supporting mechanism in the vertical direction Z.

Although this application has been described with reference to exemplary embodiments, various improvements may be made to the embodiments without departing from the scope of this application, and the components of this application may be replaced with equivalents. Particularly, to the extent that no structural conflict exists, various technical features mentioned in various embodiments may be combined in any manner. This application is not limited to the specific embodiments disclosed herein, but includes all technical solutions falling within the scope of the claims.

What is claimed is:

1. An intermediate partition plate positioning apparatus, for use in assembling of a battery module, wherein the battery module comprises at least two submodules and an intermediate partition plate, each submodule comprises a plurality of battery cells, the intermediate partition plate is disposed between two adjacent submodules, and the intermediate partition plate positioning apparatus comprises:
   a supporting mechanism, configured to hold the intermediate partition plate;
   a first adjusting mechanism, connected to the supporting mechanism, and configured to drive the supporting mechanism to move along a vertical direction; and
   a second adjusting mechanism, wherein the second adjusting mechanism is located on at least one side of the supporting mechanism along a first horizontal direction, the second adjusting mechanism comprises a clamping portion and a driving portion, the clamping portion is connected to the supporting mechanism, the driving portion is configured to drive the clamping portion to move so that the clamping portion clamps the intermediate partition plate from two sides of the intermediate partition plate along a second horizontal direction, and the first horizontal direction intersects the second horizontal direction;
   wherein the clamping portion comprises two clamping plates disposed opposite to each other along the second horizontal direction, the driving portion is configured to drive the two clamping plates to approach each other or move away from each other in the second horizontal direction, so as to clamp or release the intermediate partition plate.

2. The intermediate partition plate positioning apparatus according to claim 1, wherein
   at least two second adjusting mechanisms are disposed, one on each side of the supporting mechanism along the first horizontal direction; and
   at least one of the two second adjusting mechanisms is movably connected to the supporting mechanism, so that the second adjusting mechanisms approaches or moves away from the supporting mechanism along the first horizontal direction.

3. The intermediate partition plate positioning apparatus according to claim 1, wherein
   the intermediate partition plate positioning apparatus further comprises a driving mechanism, and the driving mechanism is disposed on the supporting mechanism; and
   the driving mechanism is connected to the second adjusting mechanism, and is configured to drive the second adjusting mechanism to move along the first horizontal direction.

4. The intermediate partition plate positioning apparatus according to claim 2, wherein one of the two second adjusting mechanisms is fixed to the supporting mechanism, and the other second adjusting mechanism is movably connected to the supporting mechanism by a driving mechanism.

5. The intermediate partition plate positioning apparatus according to claim 3, wherein
   the intermediate partition plate positioning apparatus further comprises at least one positioning piece, and the positioning piece is located on at least one of the supporting mechanism or the driving mechanism; and
   the positioning piece comprises a positioning face, the positioning face is perpendicular to the second horizontal direction, and the positioning face is configured to fit closely with the intermediate partition plate in the second horizontal direction.

6. The intermediate partition plate positioning apparatus according to claim 1, wherein two baffles spaced out along the second horizontal direction are disposed on the supporting mechanism, and a slot is formed between the two baffles and is configured to limit movement of the intermediate partition plate in the second horizontal direction.

7. The intermediate partition plate positioning apparatus according to claim 1, wherein the first adjusting mechanism comprises a cradle and a driving cylinder, at least one driving cylinder is fixed to the cradle, and the driving cylinder is connected to the supporting mechanism to drive the supporting mechanism to move along the vertical direction.

8. The intermediate partition plate positioning apparatus according to claim 7, wherein the first adjusting mechanism further comprises a guide rail and a slide block that fit with each other, one of the guide rail or the slide block is fixed to the cradle, and the other is connected to the supporting mechanism, so that the supporting mechanism slides against the cradle in the vertical direction.

9. Battery module assembling equipment, comprising the intermediate partition plate positioning apparatus according to claim 1.

*  *  *  *  *